Aug. 28, 1962     G. G. FAYARD     3,051,391
MACHINE CONTROL
Filed Feb. 25, 1957                             7 Sheets-Sheet 3
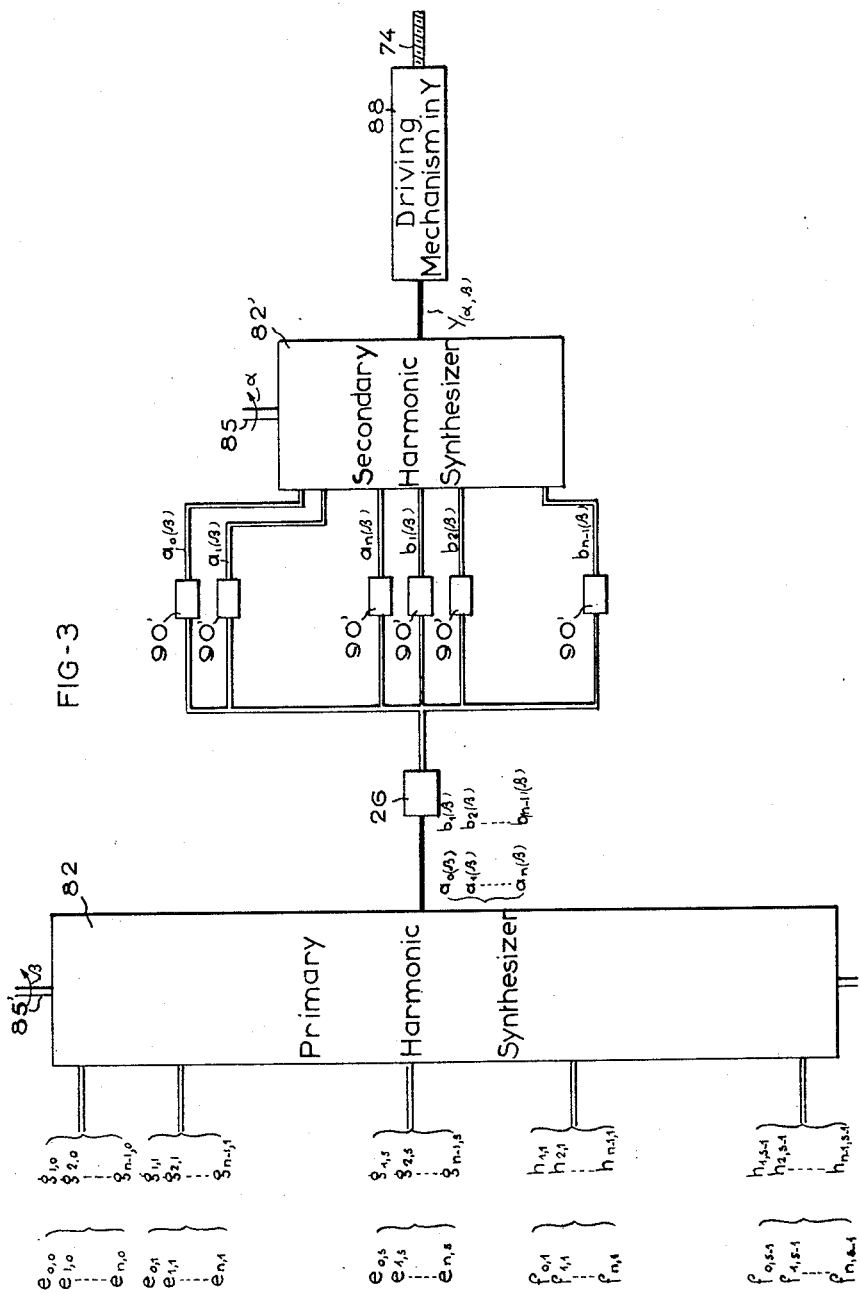

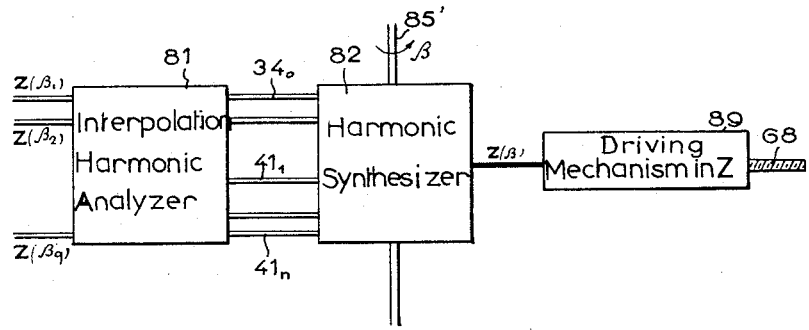
FIG_4.
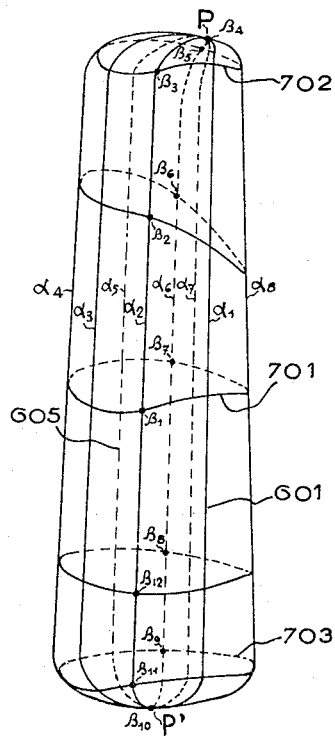
FIG_6.

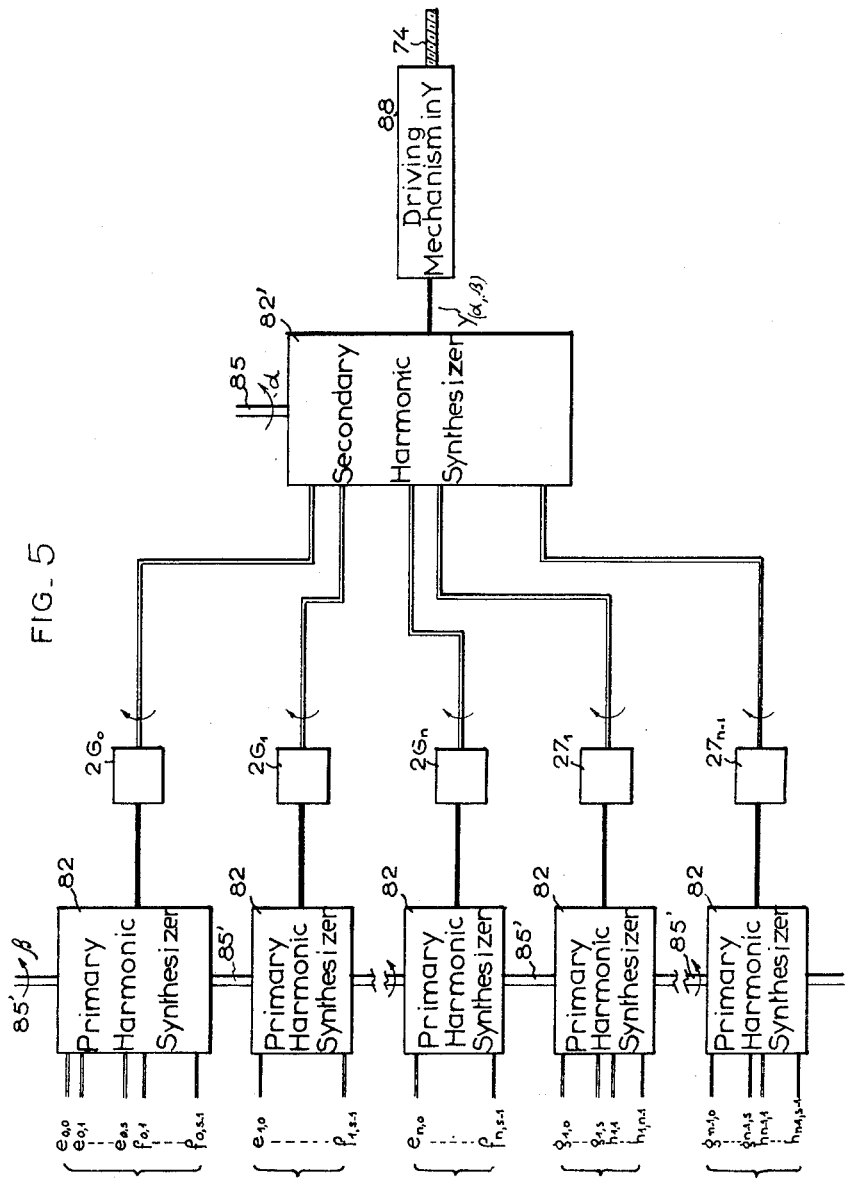

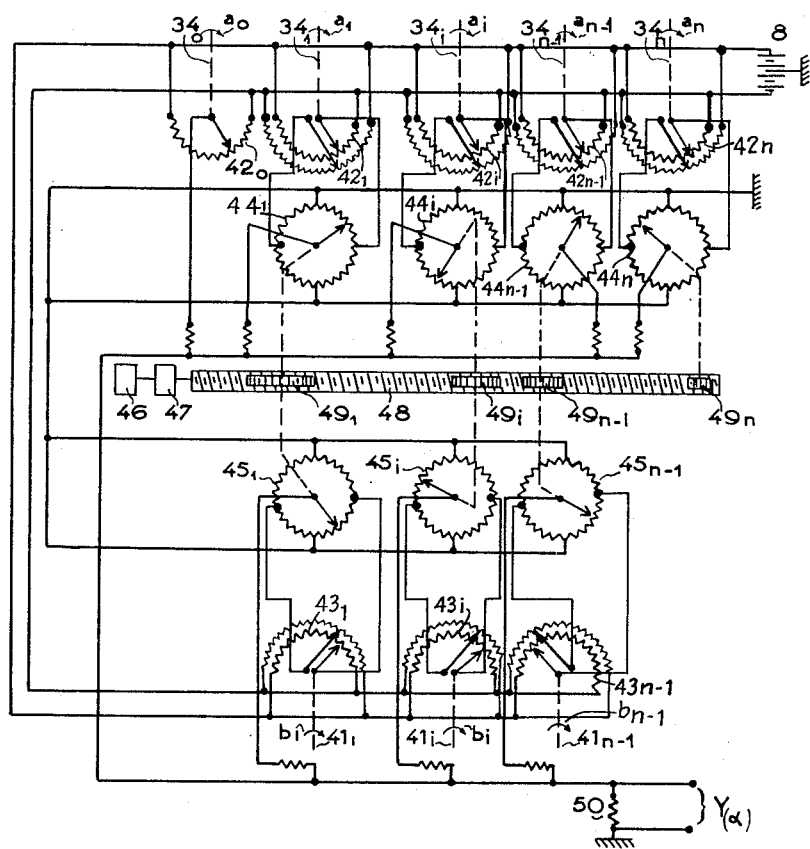

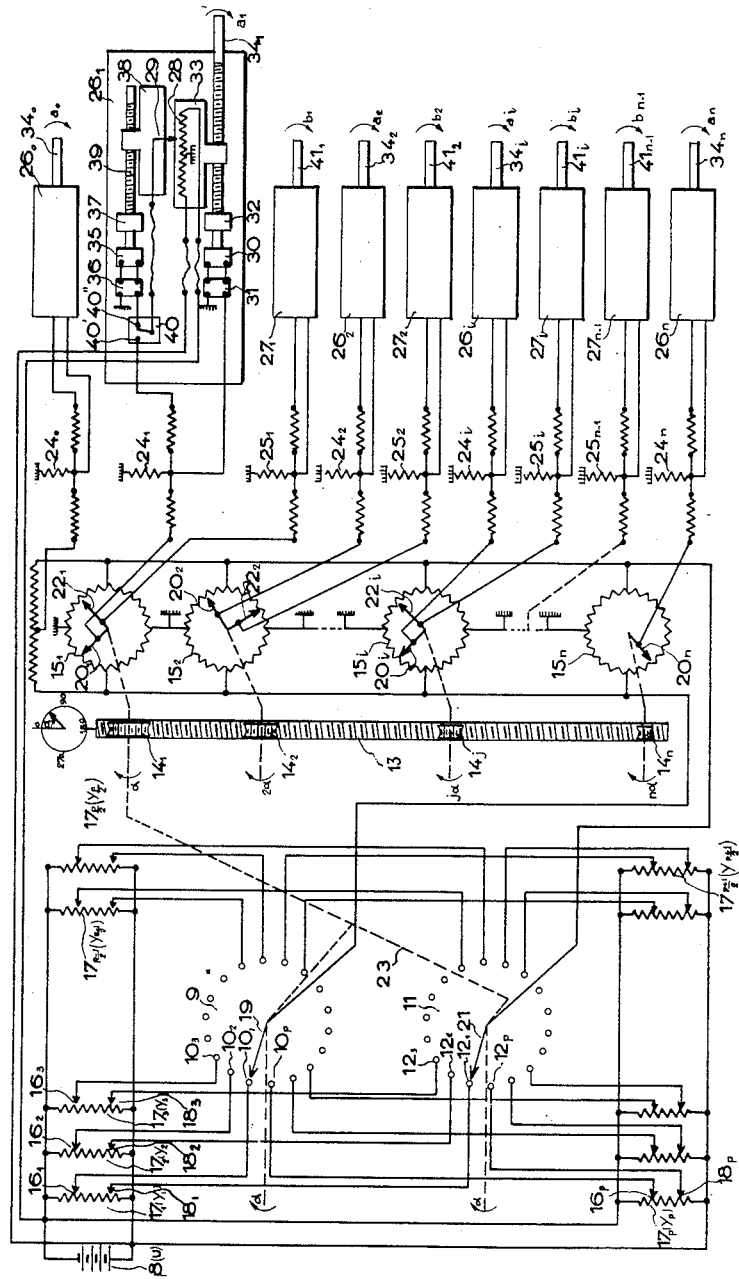

3,051,391
MACHINE CONTROL
Georges G. Fayard, Paris, France, assignor to Office
National d'Etudes et de Recherches Aeronautiques,
Chatillon-sous-Bagneux, France, a corporation of
France
Filed Feb. 25, 1957, Ser. No. 642,255
Claims priority, application France Nov. 6, 1954
4 Claims. (Cl. 235—197)

The present invention relates to automatically controlled machines, for example machines for the shaping of turbine blades and the like.

The invention provides a machine of this type which dispenses with memory devices for the shapes of patterns such as cams to be followed by a feeler or magnetic or perforated tapes which record a function of space for reproduction by the machine. Instead the machine requires only that the surface to be followed by the cutting tool be known from the coordinates of a finite number of sample points on said surface or alternatively from the three coordinates of the running point of the surface, derived from the sample coordinates by Fourier analysis and synthesis in terms of two angular parameters.

In the most general case of a closed surface, the coordinates of a running point on said surface are functions of two angular parameters and these functions can be developed in the form of Fourier series of said two angular parameters limited to a certain number of terms. This Fourier development can first be made in terms of one parameter so as to obtain a development comprising coefficients which are functions of the other parameter. Limited Fourier developments of said coefficients are then made in terms of the second parameter and these developments comprise constant coefficients. For example one may write:

$$X(\alpha, \beta) = \sum_{j=0}^{j=N} c_j(\beta) \cos j\alpha + \sum_{j=1}^{j=n-1} d_j(\beta) \sin j\alpha$$
$$Y(\alpha, \beta) = \sum_{j=0}^{j=n} a_j(\beta) \cos j\alpha + \sum_{j=1}^{j=n-1} b_j(\beta) \sin j\alpha \quad (1)$$
$$Z(\alpha, \beta) = \sum_{j=0}^{j=n} u_j(\beta) \cos j\alpha + \sum_{j=1}^{j=n-1} v_j(\beta) \sin j\alpha$$

where $\alpha$ is the second parameter and $a_j$, $b_j$, $c_j$, $d_j$, $u_j$, $v_j$ are coefficients which are functions of the first parameter $\beta$ which will be referred to as secondary coefficients.

The secondary coefficients can also be developed in Fourier series of $\beta$ limited to a certain number of terms. Thus, in the case of $a_j$ and $b_j$:

$$a_j = \sum_{k=0}^{k=s} e_{jk} \cos k\beta + \sum_{k=1}^{k=s-1} f_{jk} \sin k\beta \quad (2)$$

$$b_j = \sum_{k=0}^{k=s} g_{jk} \cos k\beta + \sum_{k=1}^{k=s-1} h_{jk} \sin k\beta \quad (3)$$

where $e_{jk}$, $f_{jk}$, $g_{jk}$, $h_{jk}$ are constant coefficients which will be referred to as primary coefficients. It has been assumed, though unnecessary, that X, Y, Z have the same number of terms in their developments with respect to $\alpha$ and that $a_j$ and $b_j$ have also the same number of terms in their developments with respect to $\beta$.

The combination of expressions (1), (2) and (3) give:

$$Y(\alpha, \beta) = \sum_j \sum_k [e_{jk} \cos k\beta + f_{jk} \sin k\beta] \cos j\alpha$$
$$+ \sum_j \sum_k [g_{jk} \cos k\beta + h_{jk} \sin k\beta] \sin j\alpha \quad (4)$$

and similar expressions can be found for X ($\alpha$, $\beta$) and Z ($\alpha$, $\beta$).

The calculation of the primary and secondary coefficients of a given coordinate is performed by two harmonic analyzers in cascade, the secondary analyzer receiving as input data the values of said given coordinate pertaining to the sample points and giving as results the secondary coefficients corresponding to the values of parameter $\beta$ relative to said sample points and the secondary analyzer receiving as input data the secondary coefficients corresponding to said values of parameter $\beta$ and giving as results the constant primary coefficients.

The calculation of a given coordinate of the current point of the surface is performed by a plurality of primary harmonic synthesizers in parallel, receiving respectively as input data the primary coefficients and driven in accordance to the first parameter $\beta$ and giving as results the values of the secondary coefficients relative to the current point of the surface (point having as parameter $\beta$ the value of $\beta$ actually applied to the primary synthesizers) and by a secondary synthesizer receiving as input data said secondary coefficient values and driven in accordance to the second parameter $\alpha$ and giving as a result the value of the desired coordinate. Briefly speaking, the primary synthesizers generate the secondary coefficients and the secondary synthesizer generates the coordinate.

The angular parameters have no definite geometrical significance. This is an advantage in respect to the so-called analog control servosystems which require the knowledge of the physical nature of the parameters which are used. From a plurality of sample points given on the surface, a first family of curves is drawn which do not intersect one another and each curve of the family passes through a group of points; the sample points are then allotted with first parameter values uniformly distributed from zero to $2\pi$. For example if the curve which is to be considered passes through four points, then the values which are allotted to these points will be respectively 0, $\pi/2$, $\pi$, $3\pi/2$. A second family of curves is then drawn so that these families of curves intersect one another at two poles of the surface and each of the curves of the second family intersects twice the curves of the first family at these sample points. The sample points located on the curve of the second family are then allotted second parameter values which uniformly distribute from 0 to $2\pi$.

However, in the general case, both the sample points and the tool path may be arbitrarily chosen.

It often occurs in practice, that the sample points are chosen on successive horizontal cross-sectional profiles, and that machining operation is achieved by means of successive parallel layers. In this case which will be denoted hereinafter "first case" the coordinate Z is a Fourier development of parameter $\beta$ alone. The number of primary harmonic synthesizers necessary for the computation of one of the coordinates X or Y is reduced to unity, said single primary synthesizer operating successively for the different secondary coefficients. Accordingly, a restriction inherent to this case is that the simultaneous variation of $\alpha$ and $\beta$ is unauthorized.

Thus in the first case, the sample points are chosen in successive horizontal planes and the tool paths are horizontal and correspond to successive values of $\beta$.

As an intermediary case, the sample points are still chosen on successive horizontal cross-sectional profiles, the tool path being determined at will. In this case, hereinafter called "second case," the coordinate Z is a Fourier development of parameter $\beta$ alone, and there are, as in the general case, as many primary synthesizers working simultaneously as there are secondary coefficients. The parameters $\alpha$ and $\beta$ are thus allowed to vary simultaneously and the tool path is determined by a relationship between said parameters.

In an optional embodiment of the second case, each primary synthesizer is replaced by a function generator potentiometer.

In the first case where the coordinates X and Y depend upon two parameters $\alpha$ and $\beta$ and the coordinate Z upon parameter $\beta$ alone, the parameter $\alpha$ may be chosen in the manner explained in detail in my copending application Serial No. 545,397, filed November 7, 1955, of which this application is a continuation-in-part, i.e., in such a manner that the coordinate X, instead of being a limited Fourier series development, be a mere sine function of the second parameter $\alpha$. Thus $$X(\alpha_1\beta) = d_1(\beta) \sin \alpha$$
$$= \sin \alpha \left[ \sum_{k=0}^{k=s} m_{lk} \cos k\beta + \sum_{k=1}^{k=s-1} n_{lk} \sin k\beta \right] \quad (5)$$

The invention will now be described in detail by reference to the accompanying drawings in which:

FIG. 3 is a schematic representation of a two stage synthesizer suitable for deriving the abscissa and ordinate of the current point in the first case of machining;

FIG. 4 is a schematic representation of a combined analyzer-synthesizer for deriving the coordinate Z of the current point in the first case of machining;

FIG. 5 is a schematic representation of a two stage synthesizer system in which the first stage comprises itself a plurality of synthesizer units and which is suitable for deriving the coordinates X and Y according to the second and third cases of machining and the coordinate Z according to the third case of machining;

FIG. 6 is a diagram useful in explaining how the parameter values are alloted to the sample points;

FIG. 7 is a schematic diagram of a harmonic synthesizer; and

FIG. 8 is a schematic diagram of a harmonic analyzer.

Figure 1:
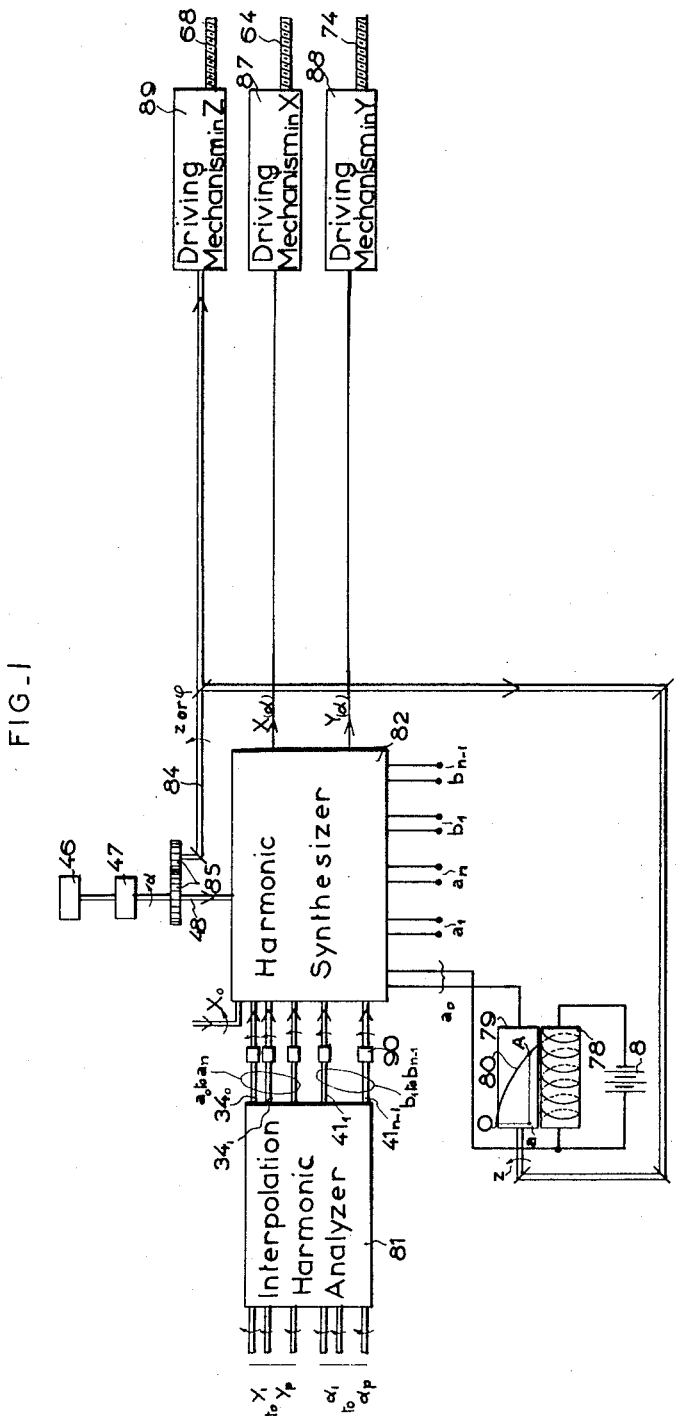
FIG. 1 is a block diagram of one type of machine control according to the invention.

Referring first to FIG. 1, the invention comprises a harmonic analyzer 81, which, from data constituted by the ordinates of points on the profile and of the parameters corresponding to these ordinates, develops the values of the coefficients in a limited Fourier development of the ordinate, these coefficients $a_0$ and $a_n$ and $b_1$ to $b_{n-1}$ taking for example the form of rotations of shafts $34_0$ to $34_n$ and $41_1$ to $41_{n-1}$.

The rotations of these shafts thus constitute input data to the harmonic synthesizer 82, which receives as supplementary input data a variable angle $\alpha$ in the form of a rotation of the shaft 48 representing the output of a speed reducer 47 driven by a motor 46. The synthesizer also receives as input data the quantity $d_1$ (see Equation (5)) again in the form of a shaft rotation. Of course, if the abscissa X of the profile, instead of being a simple sinusoidal function is like the ordinate a limited Fourier series, the terms for this series would be obtained by means of a second harmonic analyzer identical to the analyzer 81.

The voltages representative of X and Y developed by synthesizer 82 as functions of $\alpha$ are applied respectively to abscissa and ordinate servomechanisms 87 and 88 which control screws 64 and 74 for positioning the cutting tool with respect to the workpiece in orthogonal directions of a horizontal plane. A shaft 84 driven from shaft 48 via gearing 85 controls a similar mechanisms 89 for the Z direction whose screw 68 adjusts the relative position of cutter and workpiece vertically.

The coefficients $a_0$ to $a_n$ and $b_1$ to $b_{n-1}$ are functions of the altitude Z and the quantities are represented by means of functional potentiometers which are rotated as functions of Z.

Various types of functional potentiometers are known. It is for example possible to use here the potentiometers described in U.S. Patent 2,554,811. These comprise two cylinders in contact, one of which is uniformly wound and the other of which includes, salient above its cylindrical surface, a conductor disposed along a specified curve. If for example, this conductor lies along a curve which is sinusoidal on the developed surface of the cylinder, the potentiometer comprising the two cylinders will be sinusoidal. It is of course understood that other types of functional potentiometers may also be used. When the secondary coefficients have been derived from the sample coordinates, the clutches 90 on shafts $34_0$ to $34_n$ and $41_1$ to $41_{n-1}$ which connect analyzer 81 and synthesizer 82 are disengaged and the synthesizer 82 receives as data voltages which are variable with Z and which represent coefficients of the limited Fourier series. These voltages are derived from functional potentiometers comprising each a first cylinder 78 whose winding is energized from D.C. source 8 and a second cylinder 79 to which is affixed a conductor 80 disposed along the curve which represents as a function of Z the value of the coefficient in the series under consideration. For this curve the values of Z are represented by successive azimuths of the cylinder 79 and the various values of the coefficient correspond to successive heights on the cylinder, for example, the height $aA$ in the figure. The voltage representative of the coefficient is taken off between one terminal of the winding on cylinder 78 and one terminal of the conductor 80. Cylinder 79 is rotated by shaft 84, which rotates proportionally to Z.

*Computation of Secondary and Primary Coefficients by Harmonic Analysis*

Figure 2:
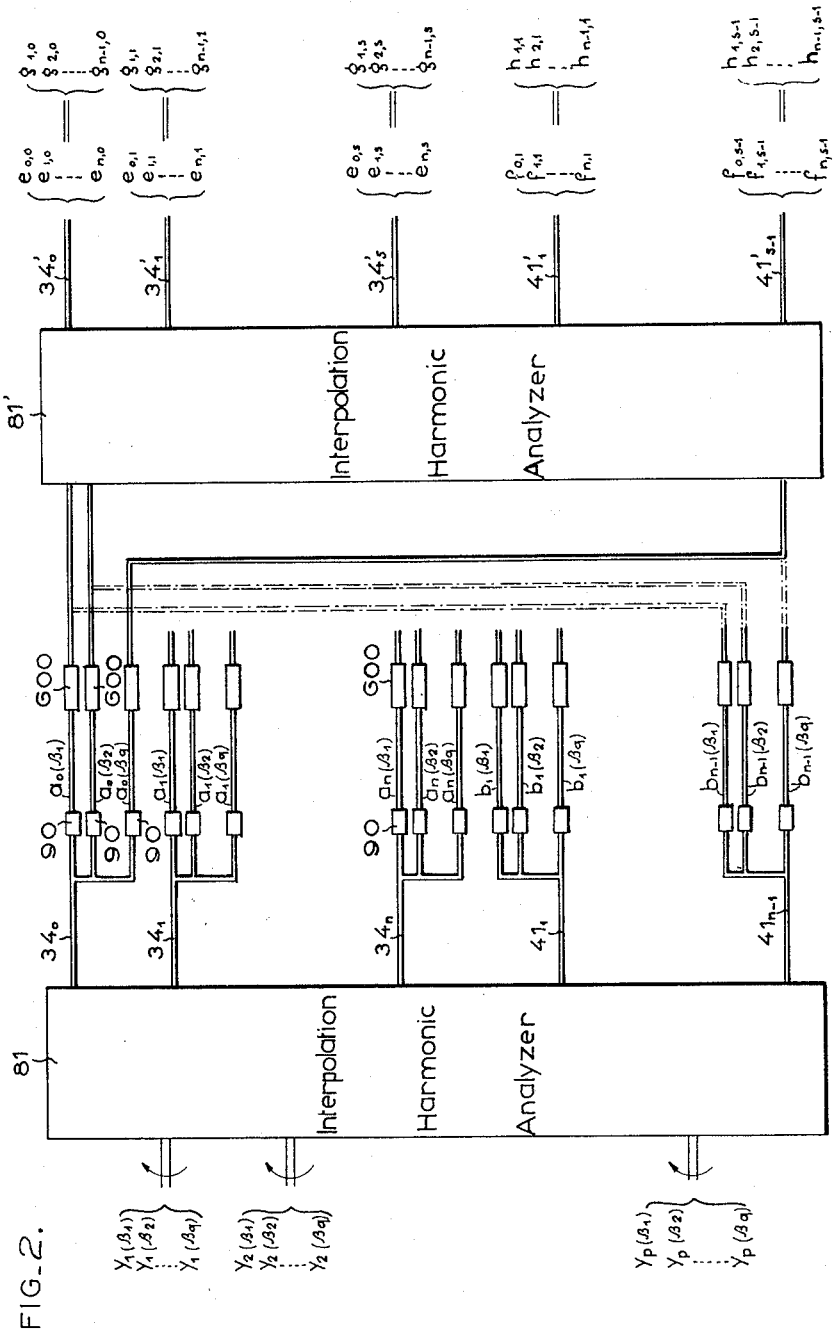
FIG. 2 is a schematic representation of a two stage analyzer suitable for deriving the secondary and primary coefficients from the coordinates of the sample points.

In FIG. 2 there is shown at 81, a harmonic analyzer (which may be of the type disclosed later in connection with FIG. 8) receiving as data the samples $Y(\alpha_1\beta)$ to $Y(\alpha_1\beta_q)$ which may be written $Y_1(_1)$ to $Y_1(\beta_q)$, $Y(\alpha_2\beta_1)$ to $Y(\alpha_2\beta_q)$ which may be written $Y_2(\beta_1)$ to $Y_2(\beta_q)$, ... $Y(\alpha_p\beta_1)$ to $Y(\alpha_p\beta_q)$ which may be written $Y_p(\beta_1)$ to $Y_p(\beta_q)$. These data may for example be introduced as shaft rotations, for example. At the output of the harmonic analyzer one obtains, likewise in the form of shaft rotations, the coefficients $a_0$ to $a_n$ and $b_1$ to $b_{n-1}$. The output shafts are identified by reference characters $34_0$ to $34_{n-1}$.

Into analyzer 81 there are successively introduced the values $Y(\alpha_1\beta_1)$, $Y(\alpha_2\beta_1)$ ... $Y(\alpha_p\beta_1)$, i.e. the ordinates of the sample points located on a curve of the family defined by $\beta=\beta_1$. By operating the analyzer as explained in relation to FIG. 8, precisely by successively stopping shaft 13 at angles $\alpha_1, \alpha_2, \ldots \alpha_p$, one obtains the value of the secondary coefficients $a_0(\beta_1), a_1(\beta_1), \ldots a_n(\beta_1)$, $b_1(\beta_1), \ldots b_{n-1}(\beta_1)$. There are then introduced the ordinates $Y(\alpha_1\beta_2), Y(\alpha_2\beta_2), \ldots Y(\alpha_p\beta_2)$ and the analyzer supplies $a_0(\beta_2), a_1(\beta_2), \ldots a_n(\beta_2), b_1(\beta_2), \ldots b_{n-1}(\beta_2)$. Each time there are introduced the samples corresponding to one of these sections, one obtains at the output, for storage in any suitable manner, the coefficients of the corresponding development. It is to be noted that in FIG. 2 and in the following $Y_2(\beta_q)$ for example means $Y(\alpha_2\beta_q)$, i.e. the ordinate of the sample point at the intersection of the curves $\alpha=\alpha_2$ and $\beta=\beta_q$. In this figure the output shaft $34_0$ is shown coupled to a series of clutches 90. Each of these clutches is linked to a storage device 600 intended to record the angular position of shaft $34_0$ upon completion of the analysis for one of the values $\beta_1, \beta_2, \ldots \beta_q$.

The other shafts $34_1, 34_n, 41_1, 41_{n-1}$ are also coupled each to a clutch 90 followed by a recording device 600.

Of the clutches 90, all except that corresponding to the value of $\beta$ instantaneously under analysis are disengaged. This is likewise true with respect to the output shafts of analyzer 81. When the parameter $\beta$ assumes the value $\beta_1$, i.e., when the input data to analyzer 81 comprises the values $Y_1(\beta_1)$, $Y_2(\beta_1)$ ... $Y_p(\beta_1)$, the clutches 90 corresponding to $a_0(\beta_1), a_1(\beta_1) \ldots a_n(\beta_1)$, $$b_1(\beta_1) \ldots b_{n-1}(\beta_1)$$

are engaged. The others are disengaged. The same analysis is then successively repeated for the $\beta$ values $\beta_2$, $\beta_3 \ldots \beta_q$, and the results are recorded in storage devices 600.

Possessing now samples of the secondary coefficients $a_0(\beta_1) \ldots b_{n-1}(\beta_q)$, it is appropriate next to compute the primary coefficients which are the coefficients of the limited Fourier developments of $a_0(\beta) \ldots b_{n-1}(\beta)$, as functions of the parameter $\beta$. An analyzer 81' similar to analyzer 81 and which indeed may be the analyzer 81 itself, is used for this operation. In FIG. 2 the analyzer 81' is shown as employed to compute the primary coefficients relative to $a_0$. The shaft 13 of analyzer 81' is successively stopped at angle $\beta_1, \beta_2, \ldots \beta_q$. The primary coefficients relative to the secondary coefficient $a_j$ have already been designated as $e_{jk}$ and $f_{jk}$, for the cosine and sine terms respectively. It is hence the coefficients $e_{0,0}$ to $e_{0,s}$ and $f_{0,1}$ to $f_{0,s-1}$ which appear on the output shafts $34'_0$ to $41'_{s-1}$ of the analyzer 81' and which are stored in suitable memory devices which may be similar to the device 600 above mentioned with respect to analyzer 81.

The analyzer 81' thus having computed the primary coefficients $e_{0,0}$ to $e_{0,s}$ and $f_{0,1}$ to $f_{0,s-1}$ for $a_0$, it will be coupled to the memories 600 corresponding to coefficient $a_1$, i.e., to those which correspond to shaft $34_1$ of analyzer 81 and then to those corresponding to the coefficient $a_2 \ldots a_n$ which correspond to the same shafts $34_2$ to $34_n$ of analyzer 81.

When the analyzer 81' is connected with the memory devices corresponding to shafts $41_1$ to $41_{n-1}$, there appear on the output shafts $34'_0$ to $34'_s$ the primary coefficients $g_{1,0}$ to $g_{n-1,0}, \ldots g_{1,s}$ to $g_{n-1,s}$, and on the output shafts $41'_1$ to $41'_{s-1}$, there appear the primary coefficients $h_{1,1}$ to $h_{n-1,1}, \ldots h_{1,s}$ to $h_{n-1,s-1}$.

Thus beginning with the table of values:

$$\begin{array}{cccc} Y_1(\beta_1) & Y_1(\beta_2) & \ldots & Y_1(\beta_q) \\ Y_2(\beta_1) & Y_2(\beta_2) & \ldots & Y_2(\beta_q) \\ \cdot & & & \\ \cdot & & & \\ \cdot & & & \\ Y_p(\beta_1) & Y_p(\beta_2) & \ldots & Y_p(\beta_q) \end{array}$$

one arrives at the fourfold table:

$$\begin{array}{llll|llll} e_{0,0} & e_{1,0} & \ldots & e_{n,0} & f_{0,1} & f_{1,1} & \ldots & f_{n,1} \\ e_{0,1} & e_{1,1} & \ldots & e_{n,1} & f_{0,2} & f_{1,2} & \ldots & f_{n,2} \\ \cdot & & & & \cdot & & & \\ \cdot & & & & \cdot & & & \\ e_{0,s} & e_{1,s} & \ldots & e_{n,s} & f_{0,s-1} & f_{1,s-1} & \ldots & f_{n,s-1} \\ g_{1,0} & g_{2,0} & \ldots & g_{n-1,0} & h_{1,1} & h_{2,1} & \ldots & h_{n-1,1} \\ g_{1,1} & g_{2,1} & \ldots & g_{n-1,1} & h_{1,2} & h_{2,2} & \ldots & h_{n-1,2} \\ \cdot & & & & & & & \\ \cdot & & & & & & & \\ g_{1,s} & g_{2,s} & \ldots & g_{n-1,s} & \ldots & h_{1,s-1} & h_{2,s-1} & \ldots & h_{n-1,s-1} \end{array}$$

All of the primary coefficients are relative to the coordinate Y, which may be written as shown by expression (4) of the primary coefficients thus:

These primary coefficients are stored in some suitable fashion either as shaft rotations, coded voltages, punched cards, or otherwise.

Having thus calculated the primary coefficients of a coordinate which is Y in the actual case, it is appropriate to calculate the primary coefficient of the other plane coordinate, i.e. X. In the more general case, X can be written as a function of $\alpha$ by a limited development, the primary coefficients of which are denominated $c_j$ and $d_j$.

The apparatus schematically illustrated in FIG. 2 is appropriate for calculation of the primary coefficients relative to X and they are thereafter suitably recorded.

In the first case where $$X(\alpha,\beta) = d_1(\beta) \sin\alpha$$

the computation of the primary coefficients $m_{1k}$, $n_{1k}$ corresponding to the secondary coefficient $d_1$ is a one stage operation which reduces to the computation of the development of $d_1$ with respect to $\beta$.

If the coordinate Z is a function of the parameter $\beta$ alone, the computation of the coefficients of the limited development of Z with respect to $\beta$ may then be performed in a one-stage analyzer. If Z is a function of two parameters $\alpha$ and $\beta$, the computation of the primary coefficients for Z is performed as hereinabove described with reference to FIG. 2. Of course, the primary coefficients of the coordinates X, Y and Z obtained by one- or two-stage analysis may also be manually computed.

A description will now be given of how this mass of data is used for evaluation of the coodinates of the running point in the three cases previously stated.

*First Case: Coordinate Z Is a Function of One Parameter Only and the Path of the Tool Comprises Parallel Passes*

In FIG. 4 there is shown the combined analyzer and synthesizer for Z for this embodiment. The sample values $Z(\beta_1) \ldots Z(\beta_q)$ are introduced into the analyzer 81 as shaft rotations. The coefficients appear on the output shafts $34_0$ to $34_n$ and $41_1$ to $41_{n-1}$ in the form of shaft rotations which are then introduced into the synthesizer 82, which may be of one of the types previously described, that of FIG. 9 for example. The driving shaft 85' of synthesizer 82 turns according to parameter $\beta$. At the output there appears the variable Z as a function of $\beta$ in the form of a voltage which acts on the servo mechanism 89 which controls the Z motion in the machine tool, as symbolized by the lead screw 68.

In FIG. 3 there is shown the synthesizer computer for X and Y. A primary synthesizer 82 receives as input values the primary coefficients relative to a secondary coefficient. In the case of secondary coefficient $a_0$ this computer receives on its input shafts the primary coefficients $e_{0,0}$ to $e_{0,s}$ and $f_{0,1}$ to $f_{0,s-1}$. The operation is as if at this moment these shafts were coupled to the output shafts $34'_0$ to $34'_s$ and $41'_1$ to $41'_{s-1}$ of the analyzer of FIG. 2 when the latter computes the primary coefficients of the secondary coefficient $a_0$. The computer 82 of FIG. 3 moreover receives as an input datum the parameter $\beta$ in the form of an angular position for the shaft 85' (which is the same as the shaft 85' of FIG. 4).

At the output of the synthesizer 82 of FIG. 3 a secondary coefficient such as $a_0$ appears in the form of a voltage, as a function of the parameter $\beta$ introduced at the shaft 85'. A servomechanism 26 translates this voltage into a shaft rotation which is introduced into a secondary synthesizer 82' by means of clutches 90'. One of these clutches, that corresponding to the computed coefficient, is engaged whereas the others are disengaged. Consequently, the coefficient $a_0$ is introduced as input data into the computer 82'. The same process is then performed for the coefficients $a_1 \ldots a_n, b_1 \ldots b_{n-1}$.

When the synthesizer 82' has recorded all of these values, all of which, as already said, relate to a specified value of $\beta$ it is in condition to deliver a voltage representing the value of the coordinate Y as a function of $\alpha$, which is introduced as a rotation of shaft 85. The synthesizer 82' hence develops $Y(\alpha,\beta)$ in the form of a voltage which, operating on servomechanism 88, produces rotation of the lead screw 74 in the drive of the machine tool.

Another computing complex similar to that of FIG. 3 simultaneously develops the coordinate $X(\alpha,\beta)$ of the moving point M. Of course, if the distribution of the initial samples gives a development of X as a function of α including only a single term, as previously described, the computer employed for this purpose may be much simplified.

Two computing complexes according to FIG. 3 and one according to FIG. 4 thus develop the three coordinates X, Y and Z as functions of the parameter α, provided the parameter β is fixed during the variation of α. This apparatus is hence appropriate for machining operations in the three-dimensional space by means of successive parallel, e.g. horizontal, layers.

*Second Case: Coordinate Z Is a Function of One Parameter Only and the Path of the Tool Is Arbitrary*

FIG. 5 is a schematic representation of a computing complex according to the second embodiment of the invention. It differs from that of FIG. 4 in that there are as many primary synthesizers 82 as there are secondary coefficients to be developed, and not a single primary synthesizer computing these coefficients successively.

In FIG. 5 all of the primary synthesizers receive from a common shaft 85' a rotation proportional to the parameter β. The first of these synthesizers develop the coefficient $a_0(\beta)$, the second develops the coefficients $a_1(\beta)$, and so on to the coefficient $b_{n-1}(\beta)$. These coefficients appear as outputs in the form of voltages which operate respectively on servomechanisms $26_0$ to $26_n$ and $27_1$ to $27_{n-1}$. The servomechanisms transform these voltages into shaft rotations. These servomechanisms are of the type indicated by the same reference characters in FIG. 8. The servo 26 in FIG. 4 is also of this type. These shaft rotations are transmitted to the secondary synthesizer 82', which received the parameter α from shaft 85. Synthesizer 82' here plays the same part as the similar synthesizer of FIG. 4 and it is followed by the same elements. Hence, the apparatus of FIG. 5 produces the coordinate $Y(\alpha,\beta)$, consistently with the possibility of independent variations of the parameters α and β.

In FIG. 5 there are shown at each of the blocks 82 synthesizers of one of the types above described. All of these receive as input the quantity β in the form of a shaft rotation from common shaft 85'. To the extent that certain elements of structure fulfill the same function in a plurality of the synthesizers 82, it is possible to reduce the number of such elements accordingly. Thus for example if the synthesizers are of the type including boxes of potentiometers as described in conjunction with FIG. 9 they contain, as there indicated: a source of potential energizing in parallel plural linear potentiometers which introduce the coefficients of the development. They further include sinusoidal potentiometers each energized by the movable contact of a linear potentiometer, together with means for adding the voltages thus obtained.

On the other hand such a synthesizer 82 may instead include a source of voltage, sinusoidal harmonic potentiometers, linear potentiometers energized each by the movable contact of a harmonic potentiometer, and voltage adding means.

On a given linear potentiometer it is then possible to provide a number of movable contacts adjusted according to the intended destination of the voltage to be taken therefrom. With this arrangement a single box of harmonic potentiometers may serve for all of the synthesizers 82 of FIG. 5, assuming of course that proper precautions are taken for decoupling.

Another computer similar to that of FIG. 5 develops $X(\alpha,\beta)$ and the analyzer-synthesizer combination of FIG. 4 then develops the coordinate Z. With this arrangement it is possible to effect machining operations directly in three dimensions without being restricted to successive horizontal passes. The path of the cutting tool can be arbitrary, a given path corresponding to a function relating the parameters α and β.

Nonetheless it remains necessary that the samples of coordinates initially introduced into the analyzer system of FIG. 2 be distributed by horizontal layers. This results from the fact that the coordinate Z has a privileged status, namely that its development is in terms of a single parameter, to wit: the parameter β. This restriction is however not essential to the invention.

*General Case: The Three Coordinates Are Functions of Two Parameters and the Path of the Tool Is Arbitrary*

According to the general case it is not necessary that the samples of coordinates be distributed through a discrete number of horizontal layers or sections. Control of the machine tool may then nonetheless be affected, provided only that the coordinate Z be treated in the same way as the two other coordinates X and Y as in the last-described embodiment, both for analysis and for computation or synthesis. It must therefore be treated according to the system of FIG. 2 for analysis and for synthesis according to the system of FIG. 3 or FIG. 5, according as the machining operation is or is not effected in layers or passes differing successively by uniform increments of β.

Nonetheless certain precautions must be taken in the selection of the sample data. These will be discussed in connection with FIG. 6. Computation of the coefficients in the development of any of the coordinates X, Y and Z as a function of α and β, as effected by an analyzer 81, will be correct provided that the coordinates X, Y and Z are cyclical functions of both α and β, and further provided that the sampling corresponds to successively equal increments of these two parameters. This means that if there are traced on the surface to be machined, i.e. to be produced, curves corresponding to equal values of α and then to equal values of β, every curve of the first family will intersect at least once every curve of the second family. If the surface to be machined is of the type obtainable from a spherical surface by continuous deformation, the curves derived by continuous deformation of the meridians and parallels on such a spherical surface are suitable for the parametric definition, provided that the continuous deformation does not lead to an interference of the curves which replace the meridians and parallels.

At any rate if the surface to be machined is of the spherical type, two poles should be identified or selected before any specification of the sample points. The choice of these poles is important. They should be located at points of the surface with respect to which accurate reproduction is to be achieved.

In FIG. 6 there is shown a surface on which have been chosen two poles P and P'. These correspond to values $\beta_4$ and $\beta_{10}$ of the parameter β. Each curve corresponding to a particular value of α, for example the curve 601 for which $\alpha=\alpha_1$, passes through these two poles. These are the equivalents of the meridians of a sphere, and they will by analogy be called meridians. It may be observed that the meridian 601 finds its continuation in the meridian 605 corresponding to $\alpha=\alpha_5$ on the opposite side of the poles, just as a terrestrial meridian joins together the North and South geographical poles of the earth by means of two line segments. Thus curves 601 and 605 in fact constitute a single and unique curve.

The parallels are here curves of constant β, for example the curve 701 corresponding to $\beta=\beta_1$. A complete meridian and a parallel intersect twice. In order to respect the periodicity of the coordinates X, Y and Z as functions of α and β, a convention may be adopted to the effect that the complete traverse of a parallel corresponds to an increment $2\pi$ in α and that a complete traverse of a meridian corresponds to an increment of $2\pi$ in β.

Once the meridians and parallels have been drawn on the surface to be machined, really if such a surface is available in model form and analytically if it is unknown, it is time to locate the sampling points.

In the general case there will not be the same number of samples on all parallels, but groups of samples must be on a single parallel by virtue of an appropriate choice of said parallel. If there are eight samples for the parallel 701, they will correspond on this parallel to points having parameter values $\alpha_1, \alpha_2 \ldots \alpha_8$ differing successively by increments of $2\pi/8$. If there are four samples on the parallel 702 their locations will be chosen at the intersections of this parallel with the meridians $\alpha_1$, $\alpha_3$, $\alpha_5$ and $\alpha_7$ which differ successively by increments $2\pi/4$. If there are three samples on the parallel 703, they will be spaced at points whose $\alpha$ value differs successively by $2\pi/3$.

It is to be understood that in practice the samples are not chosen as functions of meridians and parallels but rather that the curves are chosen as functions of the samples. The procedure is as follows: Once the sample points are located, the parallels are drawn, one and only one parallel passing through each sample point. The parallels must not intersect. Then a zero meridian is drawn passing through one sample point on each parallel. The disposition of the remaining meridians is then determined.

The analysis is then made in X, Y and Z in the manner described above in conjunction with FIG. 2. Machining in three dimensions is then effected in accordance with the system described in conjunction with FIG. 5; for X, Y and Z, the path of the cutting tool is arbitrary and depends upon a relation to be introduced between $\alpha$ and $\beta$.

For the sake of completeness, a harmonic analyzer and a harmonic synthesizer, respectively suitable as analyzers 81 (or 81') of FIGS. 1, 2 and 4 and as synthesizers 82 (or 82') of FIGS. 1, 3, 4 and 5 will now be disclosed with reference to FIGS. 7 and 8. In the case of the synthesizer, it will be assumed that the variable angular parameter which is introduced into the apparatus in the form of a shaft rotation is $\alpha$.

The harmonic analyzer of FIG. 8 includes at least $p$ linear potentiometers numbered $17_1$ to $17_p$, energized from a D.C. source 8 of voltage U. On the potentiometer $17_1$ there is set up the value $Y_1$, i.e., $Y(\alpha_1 \beta_1)$ corresponding to the parameter value $\alpha_1$. Similarly potentiometer $17_p$ is set to the value of the ordinate $Y_p$, i.e., $Y(\alpha_p \beta_1)$ corresponding to the parameter value $\alpha_p$.

The wipers $16_1$ and $18_1$ of potentiometer $17_1$ are respectively connected to terminals $10_1$ and $12_1$ of rotary switches 9 and 11. These terminals are inclined to the rest position of the switches at an angle $\alpha_1$ which is equal to the value of the parameter for which the ordinate is $Y_1$. Similarly, the wipers $16_p$ and $18_p$ of potentiometer $17_p$ are respectively connected to terminals $10_p$ and $12_p$ of switches 9 and 11, and these terminals are oriented with respect to the rest position of the switches at an angle $\alpha_p$ which is equal to the value of the parameter for which the ordinate is $Y_p$. As previously stated, the values $\alpha_1$ to $\alpha_p$ of the parameter are equidistant, i.e. $\alpha_j = j\alpha_1 = j(2\pi)/p$ and the data are the values of the ordinate Y for these linearly spaced values of the parameter $\alpha$. Consequently the terminals on switches 9 and 11 are equiangularly spaced. The arms 19 and 21 of switches 9 and 11 are coupled together and are connected to the voltage supply terminals of $n$ sine and cosine multiplying potentiometers $15_1$ to $15_n$. The number $n$ of sine potentiometers is equal to the number $p$ of linear potentiometers. The sine wipers $22_1$ to $22_{n-1}$ (potentiometer $15_n$ has no sine wiper) of the sinusoidal potentiometers and the perpendicular cosine wipers $20_1$ to $20_n$ are mechanically coupled by a tangent screw 13 which engages with the worm wheels $14_1$ to $14_n$. The diameters of these worm wheels are such that when the wipers of potentiometers $15_1$ rotate through an angle $\alpha$, the wipers of potentiometer $15_2$ will rotate through an angle $2\alpha$ and so on with the wipers of potentiometer $15_n$ rotating through an angle $n\alpha$. Lastly the arms 19 and 21 of switches 9 and 11 are connected via a coupling 23 to the worm wheel $14_1$ and hence rotate through the same angle as wipers $20_1$ and $22_1$.

Shaft 13 may be turned by hand or some similar means and is designed to stop at predetermined angles $\alpha_1$, $2\alpha_1, \ldots n\alpha_1$.

When the tangent screw 13 is inclined at the angle $\alpha_1$ to its rest position, potentiometers $15_1$ to $15_n$ are energized with a voltage representative of $Y_1$ and their cosine wipers supply to the terminals of load resistors $24_1$ to $24_n$ voltages $Y_1 \cos \alpha_1$
$Y_1 \cos 2\alpha_1$
. . . . . . . .
$Y_1 \cos n\alpha_1$ and their sine wipers supply to the terminals of load resistors $25_1$ to $25_{n-1}$ voltages $Y_1 \sin \alpha_1$
$Y_1 \sin 2\alpha_1$
. . . . . . . . . . .
$Y_1 \sin (n-1)\alpha_1$ When the tangent screw is inclined to its rest position at an angle $j\alpha_1$, the potentiometers $15_1$ to $15_n$ are energized with a voltage representative of $Y_j$ and apply to the load resistors $24_1$ to $24_n$ voltages $Y_j \cos j\alpha_1$
$Y_j \cos 2j\alpha_1$
. . . . . .
$Y_j \cos nj\alpha_1$ and, to the load resistors $25_1$ to $25_{n-1}$, voltages $Y_j \sin j\alpha_1$
$Y_j \sin 2j\alpha_1$
. . . . . . . . .
$Y_j \sin (n-1)j\alpha_1$ Servomechanisms $26_0$ to $26_n$ and $27_1$ to $27_{n-1}$ have their voltage input terminals connected respectively to the resistors $24_0$ to $24_n$ and $25_1$ to $25_{n-1}$.

Each servomechanism includes a reference potentiometer whose winding 28 is energized from source 8 and a wiper 29. The winding 28 is mounted on a support 33 coupled to lead screw $34_1$. This screw is driven, through a reducing mechanism 32, by a motor 30 which is energized via an amplifier 31 by means of a voltage equal to the difference between the output voltage available at wiper $20_1$ and the output voltage of potentiometer 28.

The wiper 29 is mounted on a support 38 which is coupled to lead screw 39. This screw is driven, via a speed reducer 38, by a motor 35 which is energized, via amplifier 36, by the output voltage of potentiometer 28.

A switch 40 makes it possible to apply the output voltage of potentiometer 28 (i.e. that taken at tap 39) to the terminals of resistor $24_1$ or to the input of amplifier 36, these two positions for switch 40 being identified as 40' and 40'', respectively.

With now the tangent screw 13 inclined to its rest position at an angle $\alpha_1$ and with switch 40 in position 40', the screw 34 rotates through an angle proportional to $Y_1 \cos \alpha_1$. The switch 40 is then shifted to position 40'' and the screw 39 turns through an angle equal to $Y_1 \cos \alpha_1$. The potentiometer 28—29 is then restored to its rest position. The tangent screw 13 is then caused to shift to a position inclined to its rest position at an angle $2\alpha_1$, and screw 34 rotates through an angle proportional to $Y_2 \cos 2\alpha_1$. When the switches 9 and 11 have scanned all their terminals, the shaft $34_1$ gives an indication proportional to $$\frac{2}{p}\sum_{j=1}^{p} Y_j \cos j\alpha_1$$

i.e. proportional to $a_1(\beta_1)$ (see FIG. 2, analyzer 81). In the same fashion, it may be seen that the servomechanism having its input terminals connected to resistors $25_1$ produces on its shaft $41_1$ an indication proportional to $b_1(\beta_1)$. In general terms, the servo connected to resistor $24_i$ gives on its shaft $34_i$ an indication proportional to $a_i(\beta_1)$, and the servo connected to resistor $25_i$ gives on its shaft $41_i$ an indication proportional to $b_i(\beta_1)$.

The coefficients $a_0(\beta_1)$ to $a_n(\beta_1)$ and $b_1(\beta_1)$ to $b_{n-1}(\beta_1)$ of the Fourier development of the ordinate are thus available on shaft $34_0$ to $34_n$ and $41_1$ to $41_{n-1}$ and stored in storage devices 600 of FIG. 2. The $Y_1(\beta_1)$ to $Y_p(\beta_1)$ are replaced at the inputs of analyzer 81 of FIG. 2 by $Y_1(\beta_2)$ to $Y_p(\beta_2)$ and so on to $Y_1(\beta_q)$ to $Y_p(\beta_q)$.

FIG. 7 illustrates diagrammatically a harmonic synthesizer. It comprises $p=2n$ linear potentiometers $42_0$ to $42_n$ having parallel double windings and parallel double wipers, whose wipers are coupled to shafts $34_0$ to $34_n$ of the harmonic analyzer and $43_1$ to $43_{n-1}$ having also parallel double windings and parallel double wipers, whose wipers are driven by shafts $41_1$ to $41_{n-1}$ of the harmonic analyzer. All of these potentiometers are energized from the D.C. source 8 whose voltage is designated by U. The terminals of the two windings on the same side of the potentiometers are connected to opposite polarity terminals of source 8 so that potentials symmetrical with respect to ground be collected at the two wipers.

The output voltages from potentiometers $41_1$ to $42_n$ energize the sinusoidal potentiometers $44_1$ to $44_n$. Likewise the output voltages of potentiometers $43_1$ to $43_{n-1}$ energize the sinusoidal potentiometers $45_1$ to $45_{n-1}$.

The wipers of the sine potentiometers are driven by a motor 46 through a reducer 47, a tangent screw 48 and worm wheels $49_1$ to $49_n$ having diameters such that when the wipers of sine potentiometers $44_1$ and $45_1$ rotate through an angle $\alpha$, those of potentiometers $44_i$ and $45_i$ rotate through $i\alpha$, the wiper of potentiometer $44_n$ rotating through $n\alpha$.

The output voltages of the sine potentiometers which are representative of the terms $a_i \cos i\alpha$ and $b_i \sin i\alpha$ are applied to resistor 50 at the same time as the output voltage of potentiometer $44_0$ which is representative of $a_0$. Thus one obtains at the terminals of resistor 50 a voltage representative of $Y(\alpha)$.

While the invention has ben described herein in terms of a number of preferred embodiments, numerous modifications and variations may be made therein without departing from the scope of the invention itself which is set forth in the appended claims.

I claim:

1. Control unit for creating desired values for machining a workpiece in three dimensions according to a geometric value known from the developments of its coordinates $X(\alpha,\beta)$, $Y(\alpha,\beta)$, $Z(\alpha,\beta)$ in a three rectangular axis reference system with respect to first and second continuously varying parameters $\beta$ and $\alpha$, in the form of finite number secondary coefficient Fourier series developed as a function of the second parameter $\alpha$, said secondary coefficients being themselves developed in the form of finite-number constant primary-coefficient Fourier series developed as a function of the first parameter $\beta$, said unit comprising three sets of pluralities of primary harmonic synthesizer means, each set relating to one coordinate, each of said synthesizer means comprising a plurality of general inputs, a driving input and one output, said general inputs receiving the constant primary coefficient values relative to a given secondary coefficient and said driving input receiving a continuously variable value representative of the first parameter $\beta$, and being adapted to derive the value of said given secondary coefficient from said constant primary coefficient values and from the continuously variable value representative of the first parameter $\beta$ and to supply said secondary coefficient value to said output, and three secondary harmonic synthesizer means, each relating to a given coordinate, comprising a plurality of general inputs connected to the outputs of a given set of primary harmonic synthesizer means, a driving input receiving a continuously variable value representative of the second parameter $\alpha$ and one output and being adapted to derive the value of said given coordinate from said secondary coefficient values supplied to its general inputs and from the continuously variable value representative of the second parameter $\alpha$ and to supply said coordinate value to said output, said coordinate values derived from the three secondary harmonic synthesizer means being the desired values.

2. Control unit for creating desired values for machining a workpiece in three dimensions according to a geometric volume known from the developments of its coordinates $X(\alpha, \beta)$, $Y(\alpha, \beta)$, $Z(\beta)$ in a three rectangular axis reference system with respect to first and second continuously varying parameters $\beta$ and $\alpha$, the coordinates X and Y being functions of the two parameters in the form of finite number secondary coefficient Fourier series developed as a function of the second parameter $\alpha$, said secondary coefficients being themselves developed in the form of finite number constant primary coefficient Fourier series developed as a function of the first parameter $\beta$, and the coordinate Z being a finite number constant coefficient Fourier series developed according to the first parameter $\beta$ only, said unit comprising two sets of pluralities of primary harmonic synthesizer means, these sets relating respectively to coordinates X and Y, each of said synthesizer means comprising a plurality of general inputs, a driving input and one output, said general inputs receiving the constant primary coefficient values relative to a given secondary coefficient and said driving input receiving a continuously variable value representative of the first parameter $\beta$, and being adapted to derive the value of said given secondary coefficient from said constant primary coefficient values and from the continuously variable value representative of the first parameter $\beta$ and to supply said secondary coefficient value to said output, two secondary harmonic means, each relating respectively to coordinates X and Y, comprising a plurality of general inputs connected to the outputs of a given set of primary harmonic synthesizer means, a driving input receiving a continuously variable value representative of the second parameter $\alpha$ and one output and being adapted to derive the value of the coordinate to which it relates from said secondary coefficient values supplied to its general inputs and from the continuously variable value representative of the second parameter $\alpha$ and to supply said coordinate value to said output, and a supplementary harmonic synthesizer means relating to coordinate Z comprising a plurality of general inputs receiving the constant coefficient values of the Fourier series representative of Z, a driving input receiving a continuously variable value representative of the first parameter $\beta$ and one output, and being adapted to derive the value of the coordinate Z from said last-named constant coefficient values and from the continuously variable value representative of the first parameter $\beta$ and to supply said coordinate value to said output, said coordinate values derived from the two secondary harmonic synthesizer means and from the supplementary harmonic synthesizer means being the desired values.

3. Control unit for creating desired values for machining a workpiece in three dimensions according to a geometric volume known from the developments of its coordinates $X(\alpha, \beta)$, $Y(\alpha, \beta)$, $Z(\alpha, \beta)$ in a three rectangular axis reference system with respect to first and second continuously varying parameters $\beta$ and $\alpha$ in the form of finite number secondary coefficient Fourier series developed as a function of the second parameter $\alpha$, said secondary coefficients being themselves developed in the form of finite number sine and cosine constant primary coefficient Fourier series developed as a function of the first parameter $\beta$, said unit comprising a D.C. generator adapted to produce at its outputs voltages respectively proportional to the sine and to the cosine of the first continuously varying parameter $\beta$ and to the sine and to the cosine of multiples of said parameter, a plurality of sine and cosine voltage dividing means relating respectively to said constant primary sine and constant primary cosine coefficients, the input of said sine voltage dividing means relating to a given sine harmonic primary coefficient being connected to the output of said generator relating to the sine of the multiple of the parameter $\beta$ which is equal to said harmonic and the input of said cosine voltage dividing means relating to a given cosine harmonic primary coefficient being connected to the output of said generator relative to the cosine of the multiple of the parameter $\beta$ equal to said harmonic, adding means in number equal to the number of secondary coefficients and relating respectively to said secondary coefficients, an adding means relating to a given secondary coefficient having a plurality of inputs which are connected to the outputs of said sine and cosine voltage dividing means relating to the constant primary coefficients which form the said secondary coefficient Fourier series, and an output supplying a voltage proportional to said secondary coefficient, whereby each adding means provides the value of a secondary coefficient as a function of the first parameter $\beta$, three harmonic synthesizer means relating respectively to the three space coordinates, a harmonic synthesizer means relating to a given coordinate having a plurality of inputs which are connected to the outputs of the adding means relating to said secondary coefficients forming said coordinate Fourier series, and an output supplying a voltage proportional to the coordinate values, whereby said coordinate values derived from the three synthesizer means are the desired values.

4. Control unit for creating desired values for machining a workpiece in three dimensions according to a geometric volume known from the developments of two first coordinates X and Y in a three rectangular axis reference system with respect to a continuously varying parameter $\alpha$ and to the third coordinate Z in the form of finite number coefficient Fourier series, each coefficient being a function of the third coordinate Z, comprising a generator of the value of the cordinate Z, two sets of function generator potentiometer means, each of said sets relating to one of said two first coordinates and each of said function generator potentiometer means being fed by a voltage representing a given coefficient of the Fourier series which thereby represents the coordinate relative to the set to which said function generator potentiometer means belongs, being driven by the generator of the value of the coordinate Z and adapted to derive an output voltage from said value of the coordinate Z and said feeding voltage, said output voltage representative of said given coefficient as a function of Z, and two harmonic synthesizer means, each associated with a set of function generator potentiometer means, to derive the values of the first coordinates X and Y from said continuously varying parameter $\alpha$ and representing from the output voltage respectively as functions of Z the coefficients of the Fourier series representative of X and representing from the output voltages as functions of Z the coefficients of the Fourier series representative of Y, said first coordinate values derived from said two harmonic synthesizer means and said third coordinate value derived from said generator being the desired values.

References Cited in the file of this patent

UNITED STATES PATENTS

| | | |
|---|---|---|
| 2,497,042 | Doll | Feb. 7, 1950 |
| 2,628,539 | Neergaard | Feb. 17, 1953 |
| 2,656,101 | Haviland | Oct. 20, 1953 |
| 2,660,700 | Gates | Nov. 24, 1953 |
| 2,843,811 | Tripp | July 15, 1958 |

FOREIGN PATENTS

| | | |
|---|---|---|
| 1,120,642 | France | Apr. 23, 1956 |